United States Patent
Holmes

[11] Patent Number: 5,388,276
[45] Date of Patent: Feb. 14, 1995

[54] HEADWEAR

[75] Inventor: Richard Holmes, Nuneaton, United Kingdom

[73] Assignee: Virtuality Entertainment Limited, Leicester, United Kingdom

[21] Appl. No.: 976,994

[22] PCT Filed: Aug. 21, 1991

[86] PCT No.: PCT/GB91/01418
§ 371 Date: Feb. 2, 1993
§ 102(e) Date: Feb. 2, 1993

[87] PCT Pub. No.: WO92/03756
PCT Pub. Date: Mar. 5, 1992

[30] Foreign Application Priority Data

Aug. 24, 1990 [GB] United Kingdom ............. 9018673

[51] Int. Cl.$^6$ ............................. A42B 3/00; A61F 9/04
[52] U.S. Cl. ............................. 2/421; 2/9; 359/630
[58] Field of Search ............. 2/421, 8, 9, 410; 364/514, 516; 345/8; 358/104; 359/409, 410, 411, 630

[56] References Cited

U.S. PATENT DOCUMENTS 4,737,972  4/1988  Schoolman ............ 345/8 X
5,003,300  3/1991  Wells ..................... 345/8
5,189,512  2/1993  Cameron et al. ...... 358/104 X Primary Examiner—Peter Nerbun
Attorney, Agent, or Firm—Young & Thompson

[57] ABSTRACT

A visor 10 for mounting video display units and/or earphones on the head has a U-shaped retaining element 16 pivoted thereto about a transverse axis X', whereby the retaining element 16 can be raised to facilitate donning and doffing the visor 10 or lowered to engage the occipital region of the head to keep the visor in position. The retaining element 16 may commonly rotate about axis X' with an arch-shaped manifold 13. Preferably, the retaining element 13 is articulated to axis x' by links 15 and recesses 19 are preferably provided on opposite sides of the visor 10 to receive the folded links 15 and arms 18 of the retaining element 16 when the latter is fully lowered. In this position, the manifold 13 rests on top of the arms 18 of the retaining element 16.

10 Claims, 2 Drawing Sheets

HEADWEAR

FIELD OF INVENTION

This invention relates to an article of headwear such as a headset, helmet or visor of the type which is used to locate relative to the user's head equipment providing visual or visual and auditory stimuli. Visual display units (VDU's) may be mounted on the article for presenting imagery to the eyes of the wearer and earphones for presenting sound to the ears.

BACKGROUND OF THE INVENTION

With headsets solely for sound there is little problem in maintaining the two earphones on opposite sides of the head. Typically this has been done by mounting the two earphones at opposite ends of a resilient arch which, in use, extends over the user's head. More recently, however, the demand has grown for a headset which will also—or exclusively—display visual imagery. In flight simulators this has taken the form of a helmet providing a transparent visor through which the user looks at a screen. Computer generated images are projected onto the visor so as to be superimposed on the view of the screen. A more recent development has been a demand for a helmet which restricts the view of the wearer exclusively to closed circuit television images. Such helmets are used in space research and are worn by personnel monitoring and controlling the activity of robots at remote locations. A yet more recent development has been the need for a similar helmet to present computer generated images to the eyes of the wearer, e.g. by means of two miniature VDU's mounted on the helmet, in the experience of "virtual reality".

Such a helmet or visor should be firmly held on the head, so that it will not be disturbed by rapid movements of the wearer or an accidental knock, but not in such a way that placing it on the head—or more importantly removing it—is at all difficult. The traditional chin-strap is unsuitable. It is unsightly and restricting and does not readily provide an easily accessible quick-release facility.

SUMMARY OF THE INVENTION

Therefore in accordance with the present invention there is provided an article of headwear adapted to be worn in an orientation such that a frontal region of the article is to the front of the head, the article comprising a generally U-shaped retaining element which is pivotable over a rear region of the article about a first axis transverse of a rear region of the article between a raised position to facilitate donning and doffing the article and a lowered position in which the retaining element will engage the back of the wearer's head, characterized in that distal portions of the retaining element are pivoted at a second axis also transverse of said rear region of the article to respective ends of a pair of links the other ends of which are pivoted to said article about said first axis whereby the retaining element is movable both about said first axis between raised and lowered positions and about said second axis between positions nearer to and further from the back of the wearer's head.

Preferably the article is formed on opposite sides with rearwardly opening recesses shaped to receive the junctions between the links and the distal portions when the retaining element is in a fully lowered position.

A central region of the retaining element may be pivoted relative to said distal portions thereof to be relatively rotatable about a third axis transverse of the rear region of the article (10). In this construction said central region is preferably bowed and padded on its inner side.

A second, arch-shaped member may be pivoted at its distal ends to the article to be rotatable relative thereto about the same first axis as the ends of the links remote from the retaining element. The assembly of the retaining element and links may be arranged in the path of the movement of the arch-shaped member from its raised to its lowered position such that lowering of the arch-shaped member tends to cause lowering of the retaining element.

In the fully lowered position of the arch-shaped member the assembly of retaining element and links may be held in the recesses by the arch-shaped member.

Friction and/or spring and/or stop means may be associated with any one or more of said pivotal connections to inhibit, promote or limit rotational movement of the pivoted components.

BRIEF DESCRIPTION OF THE DRAWINGS

A preferred embodiment of the invention will now be described with reference to the accompanying drawings, in which.

DETAILED DESCRIPTION OF THE INVENTION

Figure 1:
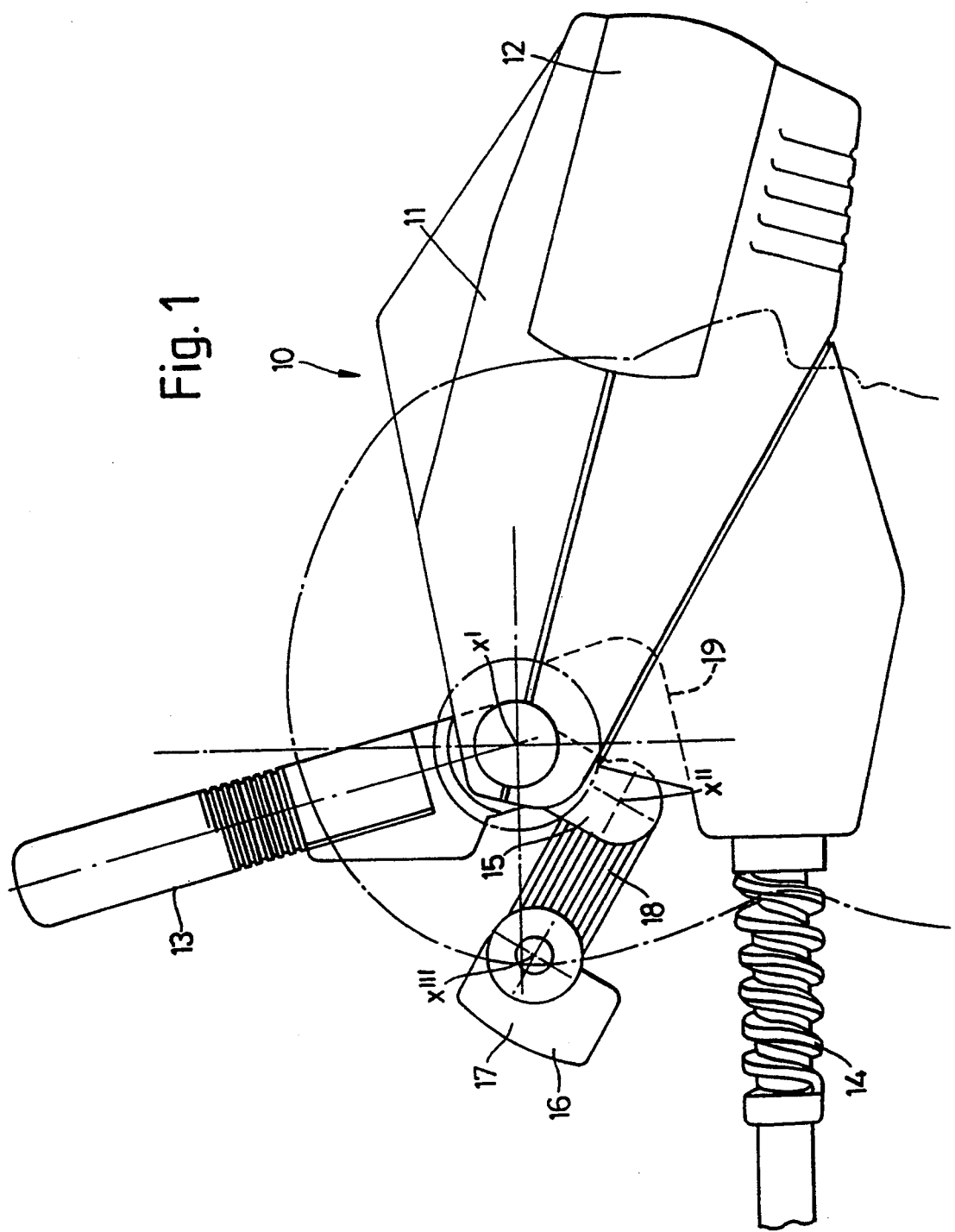
FIGS. 1 and 2 are similar side elevations of a an article of headwear in accordance with the invention but with components in different angular positions.

The article of headwear or headset 10 illustrated generally takes the form of a visor 11 internally shaped so as to locate over the wearer's head, as shown, so that a region 12 where two miniature VDUs (not shown) are mounted is in front of the wearer's eyes. An arch-shaped mounting or manifold 13 is pivoted about a first axis x' transverse of the visor so that, starting from a fully lowered position (not shown) in which it extends approximately horizontally rearwardly of the visor, it can be swung upward and over the visor through the positions illustrated. This facilitates donning and doffing the visor and accommodates a range of head sizes while helping to secure the visor to the wearer's head. At the axis x' a friction clutch (not shown) acts between the manifold and the body of the visor 11 so that the manifold 13 tends to remain in whatever angular position it is placed. The manifold 13 protects the back of the wearer's head, in use, and can be used for the mounting of associated instrumentation. A main electrical connection to the visor is illustrated at 14.

In accordance with the present invention there are also pivotally connected to the visor 11 for rotation about the axis x' a pair of links, one on either side of the visor 11, one of which is indicated at 15. The links 15 rotate about the axis x' at one of their respective ends and at the other of their respective ends they are pivotally connected to respective ends of a bowed retaining element generally indicated at 16 so that the retaining element 16 is rotatable relative to the links 15 about a second axis x'' parallel with axis x'. The retaining element has a curved central region 17 shaped to conform to the back of the wearer's head and preferably suitably internally padded. The central region 17 of the retaining element is pivoted to two distal portions thereof, one of which is visible at 18, about a third axis x''' parallel with the other two axis x' and x". Suitably positioned stops (not shown) limit angular movement of the central part 17 relative to distal portions 18.

Figure 2:
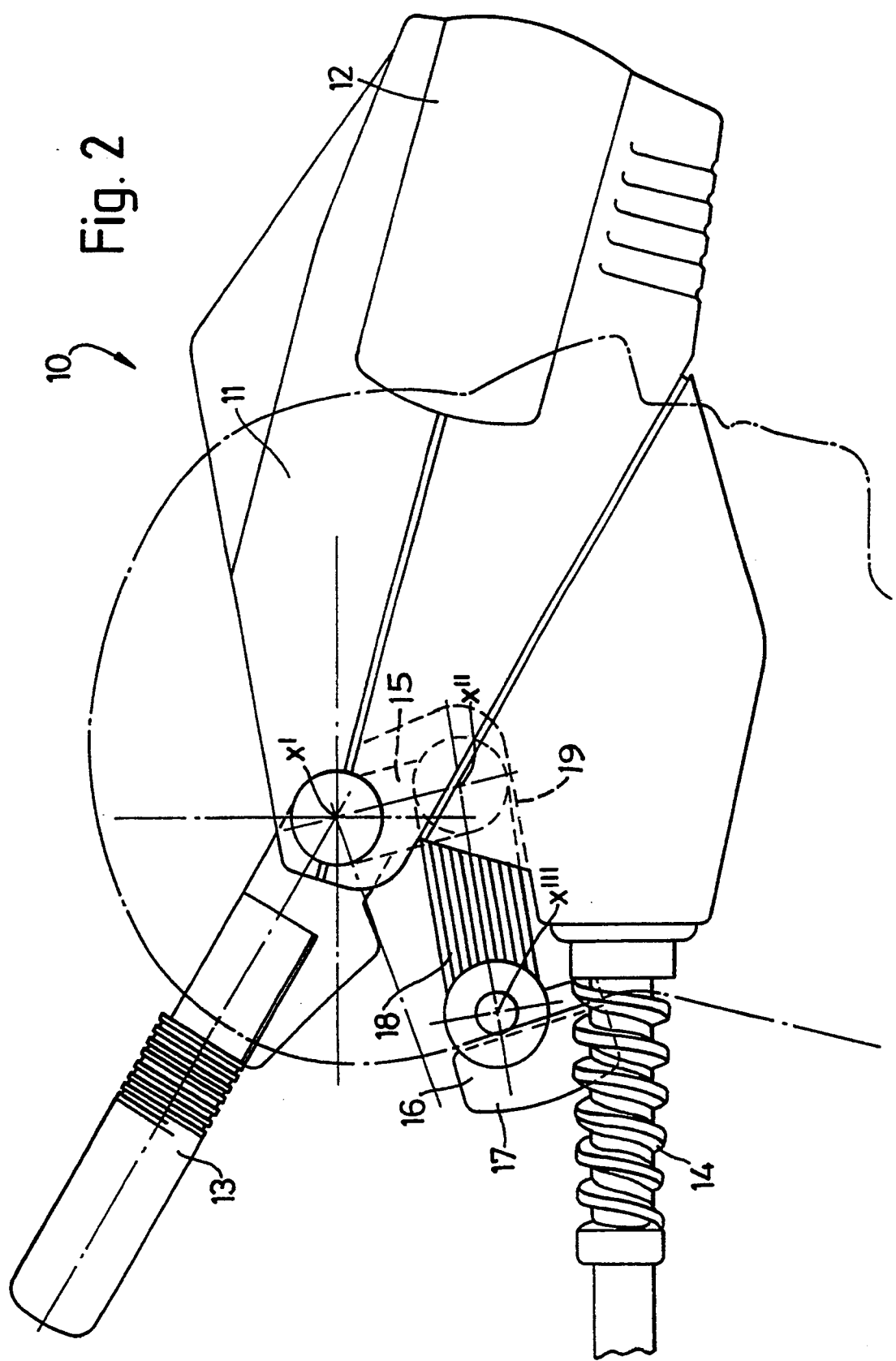

The body of the visor 11 is formed internally on opposite sides with two similar, rearwardly opening recesses one of which is shown at 19. These recesses are shaped to receive and limit the downward and inward movement of the links 15 and retaining element parts 18 on each side of the visor, thus determining a fully lowered position for the retaining element 16. Light torsion springs (not shown) at the axes x' and x" act respectively on links 15 and parts 18 to rotate them anti-clockwise, as viewed, toward the fully lowered position illustrated in FIG. 2. Similarly light torsion springs (not shown) act between each end of the central region 17 of element 16 and the associated link 18 to tend to rotate the central region 17 anti-clockwise as viewed to a stop position. In this way the central region 17 accommodates itself to differently shaped occipital regions of wearers' heads.

In use of the headset 10 the user puts it on his head with the manifold 13 in a raised position and with the links 15 of the retaining element held against their torsion springs to extend rearwardly or rearwardly and upwardly so that there is plenty of room for entry of the head into the visor. Once the visor is comfortably on the head with the viewing region 12 properly positioned in front of the eyes the retaining element 16 assembly is allowed to resume the position illustrated in FIG. 2 under the influence of the torsion springs at its axis of rotation—if necessary with manual assistance—and then manifold 13 is lowered from the position of FIG. 1 through the position of FIG. 2 to a fully lowered position (not shown) in which it extends rearwardly of the visor 11 approximately horizontally. When it rests on top of links 18 of the retaining element 16 it tends to hold the latter in place both by gravity and by the action of its friction clutch, the links 18 of the retaining element assembly resting on approximately horizontal shelves represented by the lower parts of the recesses 19. When the central part 17 of the retaining element is fully in contact with the back of the wearer's head in the occipital region (i.e. where the head is undershot) it adopts an appropriate angular position relative to distal parts 18 by rotating about axis x'''.

Removal of the visor 11 from the head simply involves raising the manifold 13 and the retaining element 16 in sequence, the latter extending rearwardly as its distal parts 18 move toward alignment with links 15.

It is claimed:

1. An article of headwear (10) adapted to be worn in an orientation such that a frontal region of the article (10) is located at the front of the head, the article comprising a generally U-shaped retaining element (16) which is pivotable over a rear region of the article (10) about a first axis (x') transverse of said rear region of the article between a raised position to facilitate donning and doffing the article (10) and a lowered position in which the retaining element (16) will engage the back of the wearer's head, wherein distal portions (18) of the retaining element (16) are pivoted at a second axis (x"), also transverse of said rear region of the article, to respective ends of a pair of links (15) the other ends of which are pivoted to said article (10) about said first axis (x') whereby the retaining element (16) is movable both about said first axis (x') between raised and lowered positions and about said second axis (x") between positions nearer to and further from the back of the wearer's head.

2. An article as claimed in claim 1, wherein the article (10) includes on opposite sides rearwardly opening recesses (19) shaped to receive junctions between the links (15) and the distal portions (18) when the retaining element (16) is in a fully lowered position.

3. An article as claimed in claim 1 wherein a central region (17) of the retaining element (16) is pivoted relative to said distal portions (18) thereof to be relatively rotatable about a third axis (x''') transverse of the rear region of the article (10).

4. An article as claimed in claim 3, wherein said central region (17) is bowed and padded on its inner side.

5. An article as claimed in claim 1, wherein a second, arch-shaped member (13) is pivoted at its distal ends to the article (10) to be rotatable relative thereto about the same first axis (x') as the ends of the links (15) remote from the retaining element (16).

6. An article as claimed in claim 5, wherein an assembly comprised of the retaining element (16) and links (15) is arranged in the path of the movement of the arch-shaped member (13) from its raised to its lowered position such that lowering of the arch-shaped member (13) tends to cause lowering of the retaining element (16).

7. An article as claimed in claim 1, further including, on opposite sides, rearwardly opening recesses shaped to receive junctions between the links and the distal portions when the retaining element is in a fully lowered position, a second arch-shaped member pivoted at its distal ends to the article to be rotatable relative thereto about the same first axis as the ends of the links remote from the retaining element, wherein an assembly comprised of the retaining element and links is arranged in the path of the movement of the arch-shaped member from its raised to its lowered position such that the lowering of the arch-shaped member tends to cause lowering of the retaining element, the arrangement being such that in the fully lowered position of the arch-shaped member the assembly of retaining element and links is held in the recesses by the arch-shaped member.

8. An article as claimed in claim 7, wherein friction means are associated with at least one of said pivotal connections to inhibit rotational movement of the pivoted components.

9. An article as claimed in claim 7, wherein spring means are associated with at least one of said pivotal connections to promote rotational movement of the pivoted components.

10. An article as claimed in claim 7, wherein stop means are associated with at least one of said pivotal connections to limit rotational movement of the pivoted components.

* * * * *